United States Patent [19]

Nakazawa

[11] Patent Number: 5,070,343

[45] Date of Patent: Dec. 3, 1991

[54] PRINTING HEAD FOR RESISTIVE RIBBON TYPE PRINTING APPARATUS

[75] Inventor: Ribun Nakazawa, Tokyo, Japan

[73] Assignee: Teikoku Piston Ring Co., Ltd., Tokyo, Japan

[21] Appl. No.: 693,058

[22] Filed: Apr. 30, 1991

Related U.S. Application Data

[63] Continuation of Ser. No. 399,612, Aug. 28, 1989, abandoned.

[51] Int. Cl.[5] ........................ G01D 15/10; B05D 5/12; H01C 17/06

[52] U.S. Cl. ................................ 346/76 PH; 346/155; 427/98; 427/103; 427/289; 29/620

[58] Field of Search ............. 346/76 PH, 155; 427/98, 427/103, 289; 29/620

[56] References Cited

U.S. PATENT DOCUMENTS

| | | | |
|---|---|---|---|
| 3,744,611 | 7/1973 | Montanari et al. | 400/120 |
| 4,170,728 | 10/1979 | Flasck | 219/216 |
| 4,350,449 | 9/1982 | Countryman et al. | 460/120 |
| 4,456,915 | 6/1984 | Crooks et al. | 346/76 PH |
| 4,679,054 | 7/1987 | Yoshikawa et al. | 346/76 PH |
| 4,983,992 | 1/1991 | Nakazawa | 346/76 PH |

FOREIGN PATENT DOCUMENTS

| | | |
|---|---|---|
| 60-214971 | 10/1985 | Japan . |
| 60-214972 | 10/1985 | Japan . |

*Primary Examiner*—Benjamin R. Fuller
*Assistant Examiner*—Gerald E. Preston
*Attorney, Agent, or Firm*—Paul & Paul

[57] ABSTRACT

A printing head which comprises an insulating substrate and a plurality of printing electrodes for a resistive ribbon type printing apparatus, in which a ribbon composed of a layer of thermal transferable ink and an electrical resistive layer is supplied with an electric current through selected printing electrodes so that the current passes through a portion of the resistive layer to generate Joule heat and melt a portion of the ink layer, and the molten ink is transferred to a paper. The ceramic substrate is provided with a plurality of U-shaped grooves, and each of the printing electrodes is formed in each of the grooves and has a thickness smaller than the depth of the grooves.

5 Claims, 3 Drawing Sheets

PRINTING HEAD FOR RESISTIVE RIBBON TYPE PRINTING APPARATUS

This application is a continuation application of Ser. No. 07/399,612 filed Aug. 28, 1989.

BACKGROUND OF THE INVENTION

1. Field of the Invention

The present invention relates to an electrothermal printing apparatus, and more particularly, to a printing head for a resistive ribbon type printing apparatus. The ribbon used in such a printing apparatus comprises a flexible base insulating (or conductive) film, a layer of thermal transferable ink facing a paper, and an electrical resistive layer facing the printing head. When an electric current is made to flow through a portion of the resistive layer from the printing electrodes coming into contact with the resistive layer, Jonle heat is generated at the portion at which the current is flowing, to melt a portion of the ink layer, and the molten ink is transferred onto a paper to form a printed image.

2. Description of the Related Art

Such a resistive ribbon type printing apparatus and the printing head thereof have been proposed in, e.g., U.S. Pat. Nos. 3744611, 4350449, and 4456915. Also such printing heads are disclosed in, e.g., Japanese Unexamined Patent Publication (JUPP) Nos. 60-214972 and 60-214971.

According to JUPP No. 60-214972, a printing head is produced by printing a conductive paste including a hard metal such as W, Mo and Mn over the entire surface of a ceramic green sheet, sintering the printed green sheet, and selectively etching the sintered metal layer (metallized layer) to form a plurality of electrodes, by a photolithography process. In this case, for example, the printing head comprises a ceramic substrate made of magnesia and silicon dioxide and having a hardness of from 500 to 600 Hv, and tungsten electrodes having a hardness of about 700 Hv and a density of 3 electrodes per mm. When the printing head is operated, the substrate and electrodes come into contact with the ribbon simultaneously. Nevertheless, a conventional ceramic substrate has a relatively high hardness, and therefore, the electrodes should have a higher hardness, which leads to the problem of an insufficient formation of fine pattern electrodes, as it is difficult to selectively etch the hard metal (W) layer to form fine electrodes.

According to JUPP No. 60-214971, a printing head is produced by depositing a conductive layer over the entire surface of ceramic substrate by a vacuum evaporation or sputtering process, forming a plating layer on the conductive layer by an electroless plating process, and selectively etching the layers to form a plurality of electrodes by a photolithography process. In this case, for example, the ceramic substrate is made of magnesia and silicon dioxide and has a hardness of from 500 to 600 Hv, and the electrodes are made of Ni-W plating layer having a thickness of 10 μm and a hardness of about 800 Hv. Since it is difficult to selectively etch such a hard alloy plating layer to form fine pattern electrodes, the obtained electrodes have an electrode density of 3 lines/mm.

As shown in FIG. 1, a conventional printing head 11 including the printing heads disclosed in JUPP Nos. 60-214972 and 60-214971 comprises a ceramic substrate 12 and a plurality of printing electrodes 13 formed on a top flat surface of the substrate 12. In this case, the printing head 11 chafes the resistive layer of the ribbon, and when an electric arc is occasionally generated between the electrodes and the resistive layer during the operation of the head 11, a portion (i.e., residue) of the resistive layer is removed and adheres to and accumulates on the top surface of the substrate 12 between the adjacent electrodes 13. This accumulation of this residue of the resistive layer will cause a short-circuiting between adjacent electrodes 13, and thus the quality of the printed image is greatly reduced.

To minimize this accumulation of residue of the resistive layer and prevent such short-circuiting, the present inventor proposed a printing head 15, as shown in FIG. 2, comprising a ceramic substrate 16 having a plurality of grooves having a segmentary cross section, which grooves are filled with electrodes 17 consisting of a lower plating layer 18 and a main plating layer 19. The head 15 is produced by etching the substrate 16 to form the grooves, forming the lower plating layer 18 in the grooves by an electroless (non-electrolytic) plating process and a selective etching process, depositing the main plating layer 19 by an electrolytic plating process, and grinding off any excess of the layer 19 to make the top surface of the head 15 flat. In this case, since the electrodes do not project above the surface of the substrate, the adhesion and accumulation of the residue of the resistive layer can be reduced. Nevertheless, when an electric arc is occasionally generated between the electrodes and the resistive layer of the ribbon, the arc will melt a portion of the resistive layer and the molten portion may adhere to an upper edge portion 20 of the substrate 16 as well as the electrodes 17. This adhered portion (i.e., resistive layer residue) forms an undesirable extension of the electrode and may cause short-circuiting between adjacent electrodes 17. Moreover, since the segment shaped grooves are formed by a photoetching process including the etching of the ceramic in a lateral direction (i.e., undercutting), the density of the formed electrodes is limited by the need for such undercutting.

SUMMARY OF THE INVENTION

An object of the present invention is to prevent short-circuiting between adjacent printing electrodes of a printing head.

Another object of the present invention is to provide a printing head having fine pattern electrodes by which the printed image quality is improved.

These and other objects of the present invention are realized by providing a printing head for a resistive ribbon type printing apparatus, which head comprises an insulating ceramic substrate and a plurality of printing electrodes, characterized in that the ceramic substrate is provided with a plurality of U-shaped grooves, and each of the printing electrodes is formed within each of the grooves and has a thickness smaller than the depth of the groove.

The ceramic to be used includes a machinable ceramic, alumina ceramic and the like. Preferably, a machinable ceramic such as a mica ceramic is used.

Also preferably, the U-shaped groove has a depth of from 10 to 40 μm (micrometers), measured from a top surface of the ceramic substrate. This is because a groove having a depth of less than 10 μm does not provide a satisfactory prevention of short-circuiting, and a groove having a depth greater than 40 μm causes a decrease of a contact pressure of the electrode on the ribbon, as the side surface of the head is usually arranged at a certain angle to the ribbon or paper.

Preferably, a dicing machine is used to form the U-shaped grooves, since a dicing machine is provided with a very thin rotary cutter and is widely used for cutting a silicon wafer into a large number of pellets during the production of a semiconductor device.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

Figure 1:
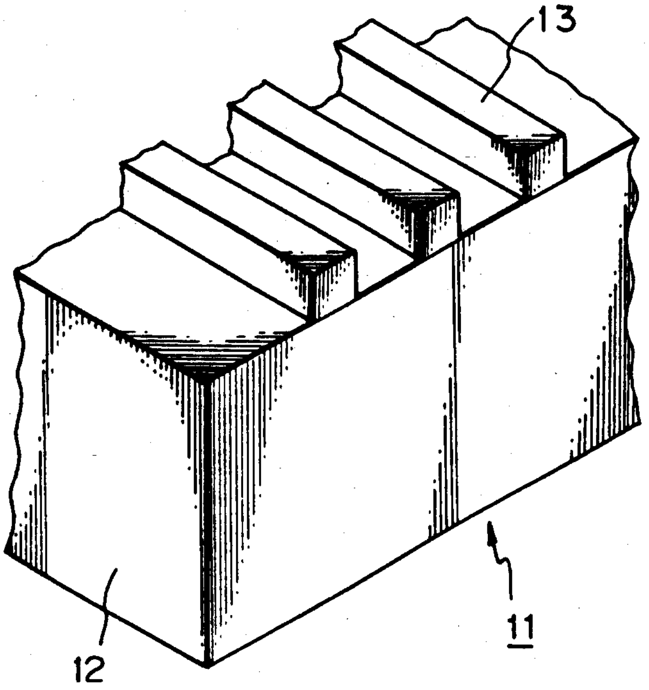
Fig. 1 (PRIOR ART)
FIG. 1 is a partial perspective view of a prior art printing head for a resistive ribbon type printing apparatus.
Figure 2:
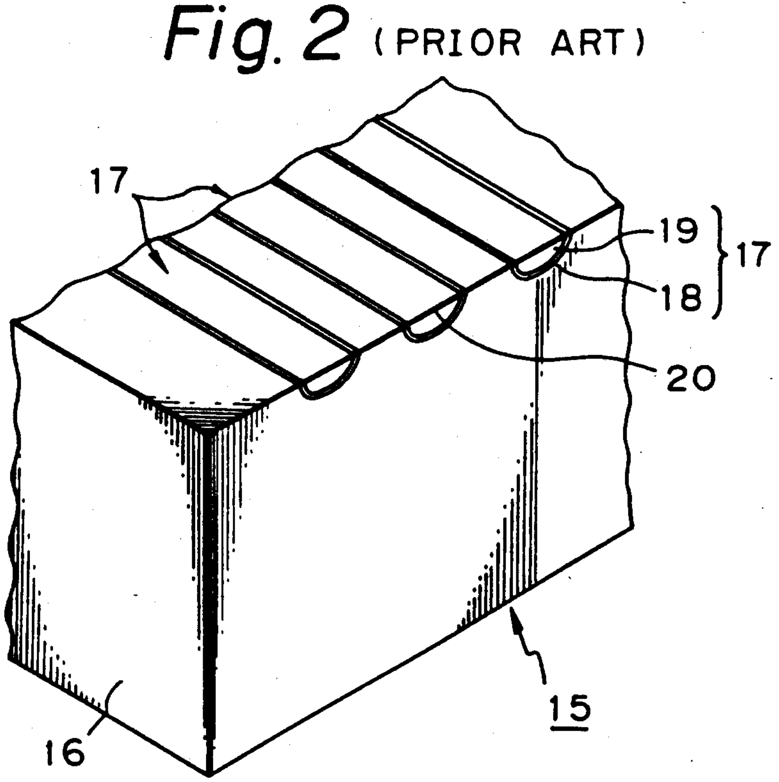
Fig. 2 (PRIOR ART)
FIG. 2 is a partial perspective view of another printing head according to the prior art.
Figure 3:
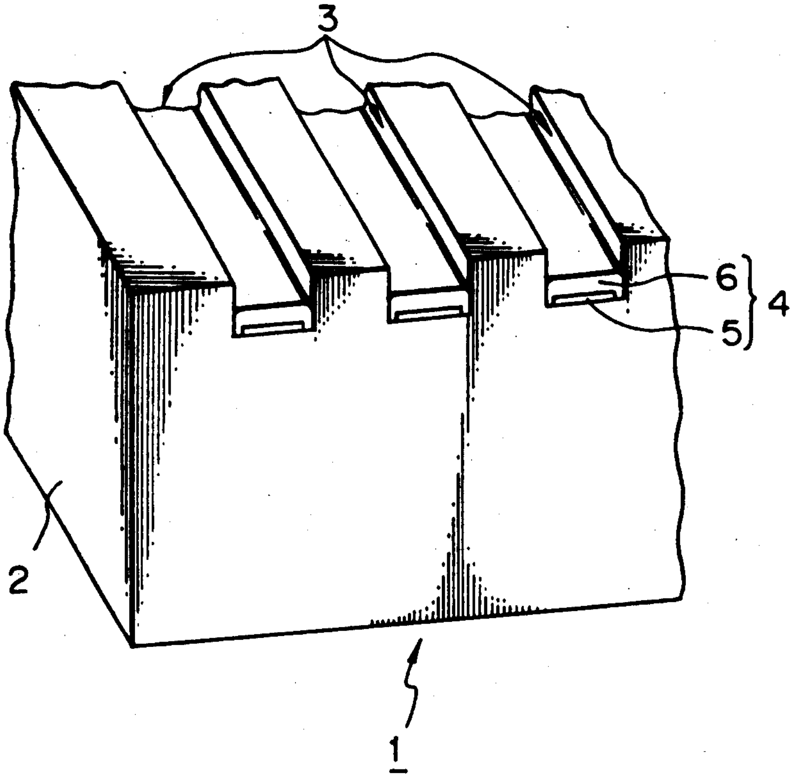
FIG. 3 is a partial perspective view of a printing head according to a first embodiment of the present invention.

Referring to FIG. 3, a printing head 1 according to the present invention comprises an insulating ceramic substrate 2 of, e.g., alumina ceramic provided with a plurality of U-shaped grooves 3, and printing electrodes 4 formed within the grooves 3 and having a thickness smaller than the depth of the groove 3. In this case, each of the printing electrodes 4 consists of, e.g., a Cu electroless plating layer 5 and a hard Cr electrolytic plating layer 6.

The printing head 1 for a resistive ribbon type printing apparatus is produced as follows.

First, the alumina ceramic substrate 2 is prepared and is set in a dicing machine, and a rotary disc blade of the dicing machine then cuts the top surface of the substrate 2 to form U-shaped grooves having a depth of 30 μm, a width of 30 μm, and a pitch of 62.5 μm, as shown in FIG. 3.

Then a Cu electroless plating layer is deposited to a thickness of 2 μm over the entire surface of the substrate 2 including the grooves 3, and is selectively etched by a conventional photoetching process to form Cu layers 5 on the bottom surface of each of the grooves 3. Next, using the Cu layers 5 as negative electrode in an electroplating process, hard Cr plating layers 6 (having a thickness of about 5 μm and a hardness of 930 Hv) are deposited on the layer 5, and thus the desired printing head is obtained.

A machinable ceramic or the like may be used instead of the alumina ceramic, for the substrate 2. A machinable ceramic (e.g., mica ceramic) has a good machinability, and thus such a ceramic is preferable. As the underlying plating layer 5, an electroless alloy plating layer composed of, e.g., Ni-P, Ni-B, Ni-W-P, the Cu plating layer, and instead of the hard Cr plating layer 6, an alloy plating of an iron family element such as Fe, Co and Ni and a refractory metal such as W, Mo and Re may be used; the alloy plating being composed, for example, of Ni-W, Co-W, Ni-Mo, Co-Mo or the like. The alloy plating may contain distributed hard particles such as $Al_2O_3$, $Cr_3C_2$, $Cr_2O_3$, WC, SiC and $Si_3N_4$ and/or lubricating particles such as BN and $MoS_2$.

A sputtering process, vacuum evaporation process, ion-plating process or the like may be used for forming the printing electrode 4 of a suitable conductive (metal) material, instead of the above-mentioned plating process. In this case, the metal material is deposited on the top surfaces of projecting portions of the substrates and on the bottom surfaces of the grooves, and any excess deposited on the top surface is removed by a suitable grinding method.

Figure 4:
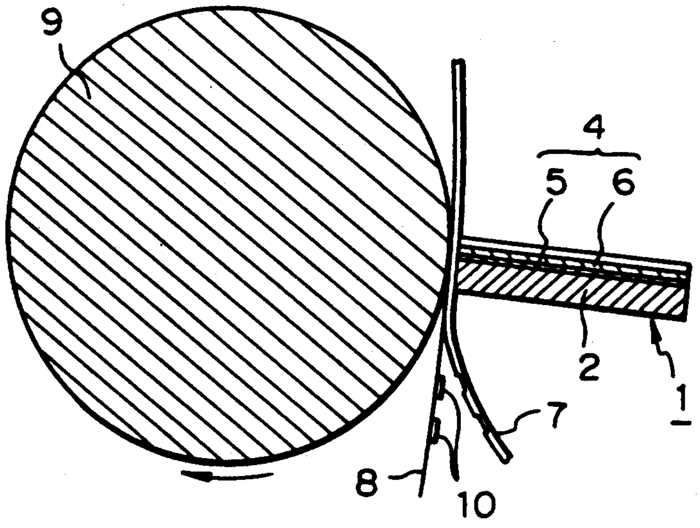
FIG. 4 is a schematic sectional view of the printing head, a ribbon, a paper, and a roller, during a printing operation.

When the obtained printing head 1 is operated, as shown in FIG. 4, the end side surfaces of the electrodes 4 are brought into contact with a resistive layer of a ribbon 7, to cause a thermal transferable ink layer thereof to come into contact with a paper 8. A roller 9 of, e.g., rubber, is arranged in such a manner that the ribbon 7 and the paper 8 are sandwiched between the roller 9 and the head 1. The roller 9 pushes the ribbon 7 and paper 8 against the electrode 4 and the substrate 2, and further, conveys the paper 8. Some of the electrodes 4 are selectively supplied with an electric current, in accordance with an image to be printed, and this current is passed to a portion of the resistive layer through the selected electrodes to generate Jonle heat at the portion through which the current flows. The generated Jonle heat melts a corresponding portion of the ink layer, and the molten ink is transferred onto the paper 8 to form the printed image 10.

Although residue of the above-mentioned resistive layer is produced, this residue lies and accumulates in a recess of each of the U-shaped grooves 3, and the projecting portion of the ceramic substrate 2 prevents contact between the accumulated residue in adjacent grooves 3, and thus the problem of short-circuiting does not arise.

The produced printing head 1 has fine pattern electrodes 4 at an electrode density of 16 lines/mm, which is greater than that (3 lines/mm) of a conventional printing head of the above-cited JUPP Nos. 60-214972 and 60-214971. Therefore, the produced printing head can print images in a finer mode, compared with the conventional printed image of JUPP Nos. 60-214972 and 60-214971.

Figure 5:
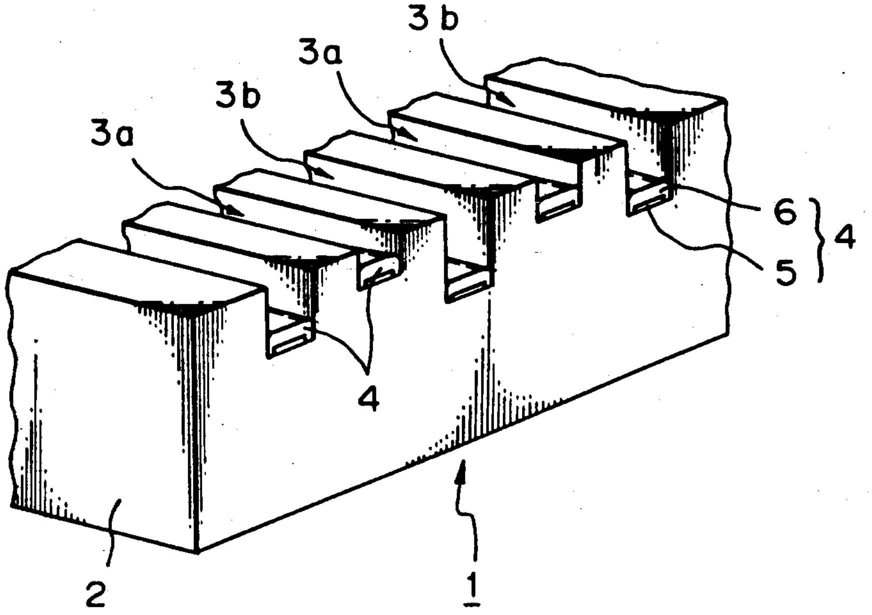
FIG. 5 is a partial perspective view of another printing head according to a second embodiment of the present invention.

As shown in FIG. 5, according to a second embodiment of the present invention, U-shaped grooves **3*a* having a shallow depth of, e.g., 20 μm, and U-shaped grooves 3*b* having a deeper depth of, e.g., 40 μm, are formed alternately in the substrate 2. Namely, the adjacent grooves 3*a* and 3*b* have different depths. This U-shaped groove formation also can be easily carried out by using the dicing machine. Plating layers 5 and 6 of the printing electrodes 4 are formed in the same manner as by the above-mentioned plating process, and thus all of the electrodes 4 have a same thickness which is smaller than the depth of the shallow grooves 3*a*. Note, as the difference in the level of the adjacent electrode 4 is very small (20 μm), no problem arises with regard to the printed image. In this case, the deeper U-shaped grooves 3*b* have a deeper recess above the electrode 4**, which recess can accommodate a larger amount of the resistive layer residue, and thus provided a greater prevention of short-circuiting.

Figure 6:
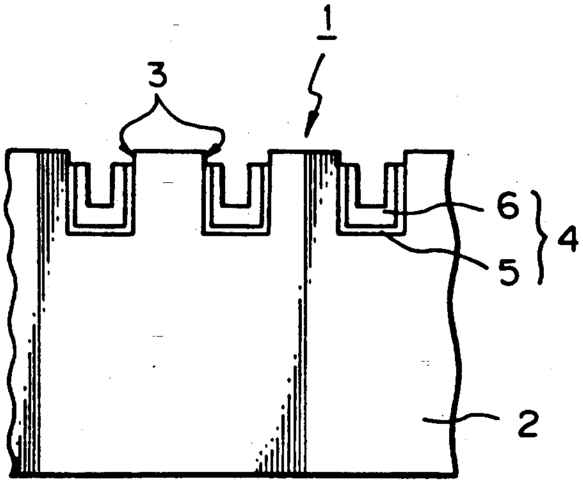
FIG. 6 is a partial perspective view of a printing head according to a third embodiment of the present invention.

As shown in FIG. 6, according to a third embodiment of the present invention, the Cu plating layer 5 is formed in a U-shape along the side surfaces and a bottom surface of the U-shaped grooves 3, instead of the flat shape shown in FIG. 3, and therefore the hard Cr plating layer 6 is formed in a U-shape and the electrode 4 also has a U-shape. In this case, the electrode 4 has a thickness smaller than the depth of the groove 3, and the two ends of the U-shaped electrode 4 are lower than the top surface of the substrate 2. The patterning of the Cu plating layer 4 in this embodiment is easier than the patterning of the layer 4 shown in FIG. 3.

According to the present invention, the projecting portions of the ceramic substrate between the adjacent U-shaped grooves and the recess above the printing electrodes within the U-shaped grooves prevent short-circuiting due to the adhering of resistive layer residue thereto. Further, since each of the printing electrodes is surrounded on three sides by the ceramic substrate, the electrodes and the ceramic are continuously worn away at the same rate. Furthermore, a plurality of the electrodes are formed in the ceramic substrate at an increased electrode density (lines per mm), and thus a high quality printed image is obtained.

It will be obvious that the present invention is not restricted to the above-mentioned embodiment and that many variations are possible for persons skilled in the art without departing from the scope of the invention.

I claim:

1. A printing head for a resistive ribbon type printing apparatus, which printing head comprises an insulating ceramic substrate and a plurality of printing electrodes, characterized in that said ceramic substrate is made of a machinable ceramic and is provided with a plurality of U-shaped grooves, and each of said printing electrodes is made of an electroless-plated thin layer formed on a bottom surface of each of said grooves, and an electroplated layer formed on said thin layer within each of said grooves, whereby said printing electrode has a thickness smaller than a depth of said grooves, wherein said electroplated layer is one selected from the group consisting of a hard Cr plating layer and an alloy plating layer.

2. A printing head according to claim 1, wherein said machinable ceramic is a mica ceramic.

3. A printing head according to claim 1, wherein said U-shaped groove has a depth of from 10 to 40 $\mu m$.

4. A printing head according to claim 1, wherein adjacent grooves of said plurality of U-shaped grooves have different depths.

5. A method of producing a printing head for a resistive ribbon type printing apparatus, comprising forming a plurality of printing electrodes on an insulating ceramic substrate, characterized in that said method comprises the steps of: forming a plurality of U-shaped grooves in said ceramic substrate of a machinable ceramic with a dicing machine; forming an electroless-plated thin layer on a bottom surface in each of said grooves; and depositing an electroplated layer on said thin layer to form said electrodes having a thickness less than the depth of said grooves, wherein said electroplated layer is one selected from the group consisting of a hard Cr plating layer and an alloy plating layer.

* * * * *